UNITED STATES PATENT OFFICE.

JACQUES GRUNHUT, OF SOUTH SHIELDS, COUNTY OF DURHAM, ENGLAND.

PROCESS OF DYEING ANILINE-BLACK.

SPECIFICATION forming part of Letters Patent No. 391,315, dated October 16, 1888.

Application filed January 3, 1888. Serial No. 259,590. (No specimens.) Patented in England December 12, 1887, No. 17,106.

*To all whom it may concern:*

Be it known that I, JACQUES GRUNHUT, manufacturing chemist, a naturalized British subject, residing at South Shields, in the county of Durham, England, have invented an Improved Process and Means of Dyeing Cotton and other Fibrous Substances in Aniline-Black, (for which I have obtained British Patent No. 17,106 of December 12, 1887); and I do hereby declare that the following is a full, clear, and exact description of the invention, which will enable others skilled in the art to which it appertains to make and use the same.

This invention relates to certain improvements in the process and means of dyeing, in aniline-black, cotton, jute, and other vegetable fibers or fibrous substances in the raw, spun, or woven state, described in my application for Letters Patent of the United States of America filed on the 6th day of December, 1887, and bearing Serial No. 257,135.

In carrying out my invention according to the present improvements, I effect the mordanting of "the said materials" (which term is herein intended to comprehend all such materials or substances to be dyed as are hereinbefore referred to) by placing the same into a suitable vessel, containing for each hundred pounds of the said materials about five hundred gallons of water, and about one-half a pound of Congo red, or of benzo-purpurine, or of blue azurine, or of chrysamine, or of paraphenylen blue, or of delta purpurine, or of Hessian red, or of benzo-azurine, or of azo-blue, or of Congo corinth, or of Hessian violet, or of Hessian purple; or by placing the said materials into a suitable vessel containing a like aqueous solution of about one-half a pound each of Congo red and of blue azurine, and with about ten pounds of soda crystals, or with about five pounds of carbonate of soda, or with about ten pounds of carbonate of potash; or by placing the said materials into a suitable vessel containing a like aqueous solution of a mixture of any of the above coloring-matters, and in each or any of such cases boiling the said materials in the solution used for about half an hour or sufficiently long for the said materials to be sufficiently mordanted or impregnated with the said coloring matters. After the said materials have been thus treated they are washed, and are subsequently dyed in aniline-black by being treated as hereinafter described—that is to say, the said materials are first placed in a suitable vessel containing for each hundred pounds of the said materials about two hundred gallons of water, about eight pounds of aniline oil, about eight pounds of bichromate of potash, and about thirty-two pounds of hydrochloric acid, and are suitably worked about in such solution, which may be either cold or warm, for about an hour and a half, or sufficiently long to be thoroughly impregnated with such solution, and are then removed and washed. The said materials are next placed in a suitable vessel containing for each hundred pounds of the said materials about two hundred gallons of water and about eight pints of sulphuric acid or a like or relatively equivalent quantity of any mineral or vegetable acid, and are left in such solution, which may be either cold or warm, for about half an hour or sufficiently long to be thoroughly impregnated with such solution, and are then removed and washed; or, in lieu of the said materials being treated according to the process described in the next preceding paragraph, they are boiled in a solution of soap or soda, or of soap and soda, for sufficiently long to be thoroughly impregnated with such solution, and are then removed and washed and are subsequently boiled in solutions of any of the aforesaid coloring-matters belonging to the azo group. The said materials are subsequently—that is, after being treated according to either of the alternative processes described in the two next preceding paragraphs—placed in a suitable vessel containing for each hundred pounds of the said materials about two hundred gallons of water, about ten pounds of carbonate of soda or any other suitable alkali, or of carbonate of potash or neutral alkali, or of phosphate of sodium, and about one pound of Hessian blue or of any other of the aforesaid azo-coloring matters, such solution being prepared by boiling the water and adding the said salt and coloring-matter, and the said materials being placed in such solution and boiled therein for about half an hour or sufficiently long to be thoroughly impregnated with such solution.

I claim as my invention—

1. The process and means of dyeing cotton, jute, and other vegetable fibers or fibrous substances, in the raw, spun, or woven state, in aniline-black, consisting in the successive steps of mordanting the said materials with solutions of coloring-matters belonging to the azo group, and in subsequently dyeing and treating the said materials successively in solutions (1) of aniline-oil, bichromate of potash, and hydrochloric acid, (2) of sulphuric acid, and (3) alkaline carbonates and color, substantially as described.

2. The process and means of dyeing cotton, jute, and other vegetable fibers or fibrous substances, in the raw, spun, or woven state, in aniline-black, consisting in the successive steps of mordanting the said materials with solutions of coloring-matters belonging to the azo group, and in subsequently dyeing and treating the said materials successively in solutions (1) of aniline-oil, bichromate of potash, and hydrochloric acid, (2) of soap or soda or soap and soda, and any of the said coloring-matters, and (3) of alkaline carbonates and color, substantially as described.

In witness whereof I have hereunto set my hand in presence of two witnesses.

JACQUES GRUNHUT.

Witnesses:
SAMUEL ROBINSON,
ARTHUR DRAKE ROBINSON.